Jan. 28, 1958 M. C. POOLE 2,820,991
REVERSIBLE WINDOW CONSTRUCTION FOR MOBILE HOMES
Filed Aug. 16, 1955 2 Sheets-Sheet 1
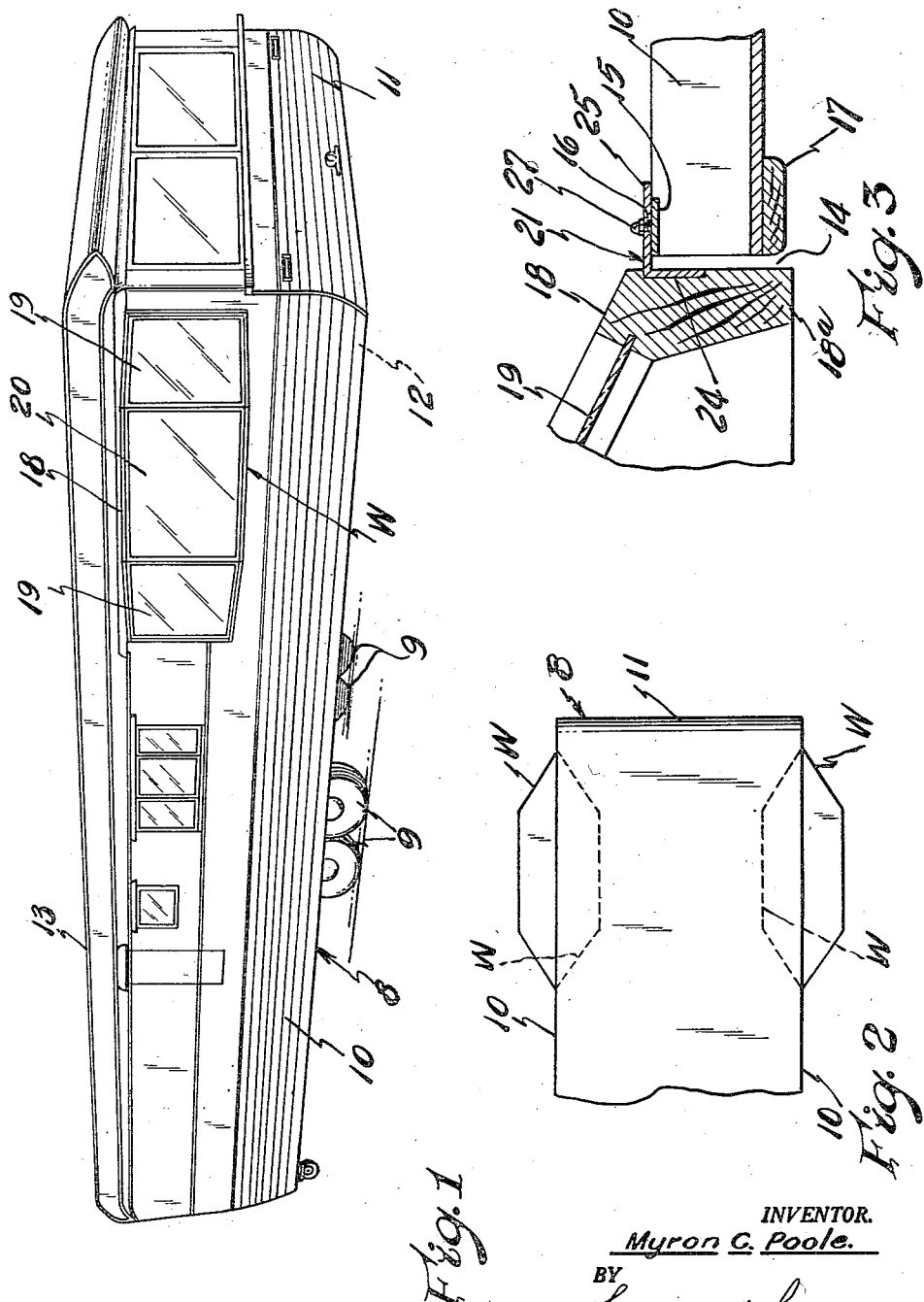
INVENTOR.
Myron C. Poole.
BY
Fearman † Fearman.
ATTORNEYS Jan. 28, 1958   M. C. POOLE   2,820,991
REVERSIBLE WINDOW CONSTRUCTION FOR MOBILE HOMES
Filed Aug. 16, 1955   2 Sheets-Sheet 2
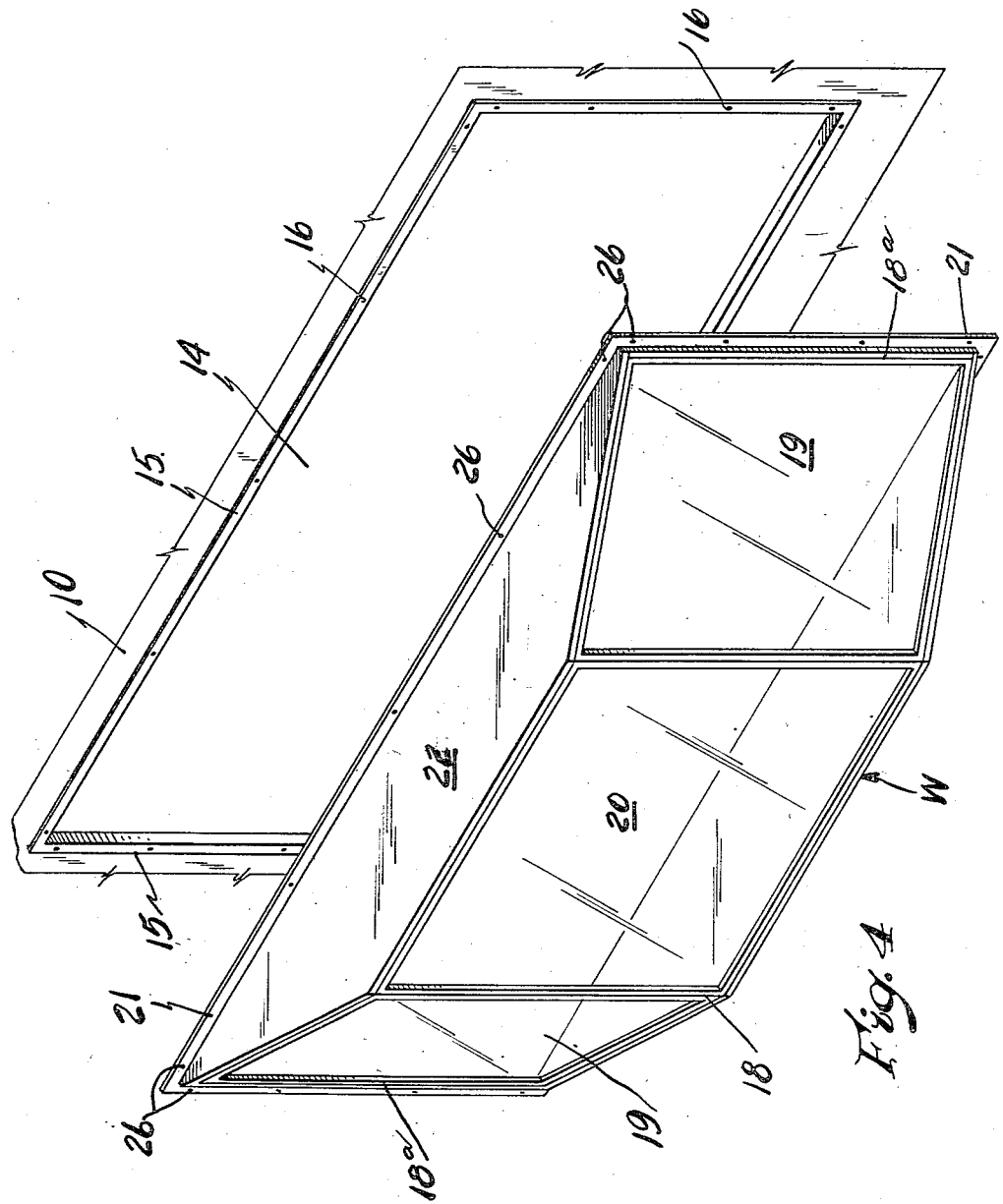
INVENTOR.
Myron C. Poole.
BY
Fearman & Fearman.
ATTORNEYS

United States Patent Office 2,820,991
Patented Jan. 28, 1958

2,820,991

REVERSIBLE WINDOW CONSTRUCTION FOR MOBILE HOMES

Myron C. Poole, Elwood, Ind., assignor to Revolvex Corporation, Alexandria, Ind., a corporation of Indiana Application August 16, 1955, Serial No. 528,702

1 Claim. (Cl. 20—40)

This invention relates to expansible mobile homes, and particularly relates to mobile homes of the house or camp type intended to provide practical living and storage accommodation, with means for providing more spacious accommodations upon arrival at the home site.

Highway regulations at present in force, provide that any vehicle traveling over the regular highway system shall not exceed eight (8) feet in width, consequently the width of all mobile homes manufactured and hauled to the homesite must conform to said regulations.

Many homes have been designed expansible for the above purpose, but few have met with public acceptance, due to the fact that they are too loosely constructed to withstand road travel, are impractical for the purpose intended, and further require excessive labor and skill to convert. Furthermore, they rapidly warp and fall into misalignment after being used for a short period of time, so that later expansible adjustment becomes a difficult problem.

It is therefore the prime object of the present invention to provide a mobile home of conventional construction provided with readily reversible bay windows, designed to fit in either conventional position and extend beyond the side wall of the home, or in reversed position on the body so that the windows in this reversed position will project into the interior of the structure, thus permitting it to be moved over the highway in strict observance of highway regulations as to vehicle width.

Still a further object is to provide a reversible bay window construction which can be easily and quickly reversed and secured, which provides additional area in the structure, creating a more spacious appearance, enhancing the view of the persons occupying the structure, and otherwise adding to the distinctive appearance of the mobile home.

A further object is to provide a reversible bay window which can be readily fitted into pre-formed openings in the walls of the mobile home, providing a neat appearing weatherproof connection, and making a very simple manufacturing operation without sacrifice of rigidity or stability.

With the above and other objects in view, the present invention consists of the combination and arrangement of parts, hereinafter more fully described, illustrated in the accompanying drawings, and more particularly pointed out in the appended claim, it being understood that changes may be made in the form, size, proportion and minor details of construction without departing from the spirit or sacrificing any of the advantages of the invention.

In the drawings:

Fig. 1 is a side elevational view of a mobile home showing my reversible window in the position it will occupy when located on its home site.

Fig. 2 is a fragmentary diagrammatic plan view, the broken lines showing the windows reversed and projecting into the interior of the trailer, and the solid lines showing the windows in normal position.

Fig. 3 is an enlarged detail showing the window connection to the side wall of the home.

Fig. 4 is an enlarged perspective view showing the window unit and matching frame.

Having reference now more particularly to the drawings in which I have shown the preferred embodiment of my invention, the numeral 8 indicates a mobile home of conventional design. This is usually mounted on wheels 9 to facilitate movement over the highways, and comprises a pair of substantially vertical sidewalls 10—10, a rear wall 11, a floor 12, and a roof 13, as usual.

Cut out openings 14 of predetermined width and height are provided in the side walls 10, and a metallic frame 15 is secured to the outer marginal face of said opening, said frame being provided with spaced apart, outwardly projecting studs 16, threaded as shown, and for a purpose to be presently described.

Suitable trim 17 is provided on the inner face of the opening to provide a finished interior appearance, and this can be of either wood or metal as desired.

The bay window units W comprise a window frame 18 in which glass panels 19 and 20 are set in the usual manner, the sections 19 being angularly disposed with relation to the main panel 20, and an angle frame 21, of the same size as frame 15 so as to overlie the latter, is secured to the window stiles 18a of said window frame. The window units W themselves, that is, exclusive of the frames 21, are of less area than the openings 44 so as to permit the units to be received within the openings as is shown in Figure 3.

Panels 22 form a closure for the space between the window frame and the angle frame 21 at both top and bottom, the leg 24 of said angle being recessed in the window frame 18, and the leg 25 being provided with a plurality of openings 26 in exact alignment with the studs 16 provided in the frame 15, so that when the window is reversed, the studs 16 register with the openings 26, and internally threaded sleeve nuts 27 are threaded on the studs to secure the window firmly in position, either projecting outside the body as indicated in Fig. 1 of the drawings, or into the interior of the body as indicated in broken lines in Fig. 2.

The securing frames 15 and 21, and the window frames 18 can of course, be formed of wood, aluminum or other metal, and while in the present instance I have shown the windows located in the side walls of the structure it will of course be obvious that they can be in the front or rear if so desired.

Mastic strips (not shown) can of course be interposed between the contacting surfaces of the frames 15 and 21 to provide a weather and insect proof connection and the windows can be of any desired size.

From the foregoing description, it will be obvious that I have perfected a very simple, practical, sturdy and economical bay window structure by means of which the interior space of the mobile home can be substantially enlarged and which is reversibly adjustable to project into the interior of the mobile home so that the home is of regulation width to permit its traveling over the highways, or from one location to another.

What I claim is:

In a mobile home structure having a rigid body including a substantially vertical wall with a cut out opening therein, and having projecting studs surrounding said opening, the combination of a reversible bay window unit adapted to project outwardly from said wall in its normal position and adapted to project inwardly from said wall in its reversed position, said bay window unit comprising a window frame conforming generally to the shape of said opening but having an area smaller than the area of said opening in said wall so as to be received therein, and a frame member secured to the periphery of said window frame and projecting therefrom so as to overlie the marginal edges of said opening, said frame member having openings therein registering with and receiving said studs in both normal and reversed positions of said window unit.

References Cited in the file of this patent
UNITED STATES PATENTS 2,506,870     Hairston              May 9, 1950

FOREIGN PATENTS 397,982     Great Britain         Sept. 7, 1933